United States Patent
Kapaan et al.

(10) Patent No.: US 6,691,837 B1
(45) Date of Patent: Feb. 17, 2004

(54) SCREW ACTUATOR WITH LUBRICANT DOSING, AND BRAKE CALLIPER

(75) Inventors: Hendrikus Jan Kapaan, Nieuwegein (NL); Thomas Wilhelm Fucks, Röthlein (DE); Jiri Gurka, Behamberg (AT); Jérôme Dubus, La Motte Servolex (FR); Christian Boch, Chambéry (FR); Clair Druet, Drumettaz Clarafond (FR); Asbjorn Bundgart, Soborg (DK); Alberto Visconti, Varese (IT)

(73) Assignee: SKF Engineering & Research Centre B.V., Nieuwegein (NL)

( * ) Notice: Subject to any disclaimer, the term of this patent is extended or adjusted under 35 U.S.C. 154(b) by 0 days.

(21) Appl. No.: 09/831,871
(22) PCT Filed: Nov. 16, 1999
(86) PCT No.: PCT/NL99/00704
  § 371 (c)(1),
  (2), (4) Date: Jul. 6, 2001
(87) PCT Pub. No.: WO00/29764
  PCT Pub. Date: May 25, 2000

(30) Foreign Application Priority Data

Nov. 17, 1998 (NL) .............................................. 1010575

(51) Int. Cl.[7] .............................................. F16D 55/02
(52) U.S. Cl. ...................... 188/72.1; 188/156; 74/89.44
(58) Field of Search .................... 74/89.44; 188/156, 188/157, 162

(56) References Cited

U.S. PATENT DOCUMENTS

| | | | |
|---|---|---|---|
| 3,132,719 A | | 5/1964 | Cole |
| 3,454,136 A | * | 7/1969 | Stark .......................... 74/89.44 |
| 3,814,217 A | | 6/1974 | Lochmann |
| 4,366,723 A | | 1/1983 | Wilke et al. |
| 4,860,859 A | * | 8/1989 | Yamatoh et al. ............. 188/72.1 |
| 5,069,076 A | * | 12/1991 | Rosenthal .................. 74/89.44 |
| 5,107,967 A | * | 4/1992 | Fujita et al. ................ 188/72.1 |
| 5,387,083 A | | 2/1995 | Larson et al. |
| 5,749,266 A | * | 5/1998 | Tsukada ..................... 74/89.44 |
| 5,809,838 A | | 9/1998 | Miyaguchi et al. ......... 74/89.44 |
| 6,059,076 A | * | 5/2000 | Dietrich et al. ............. 188/156 |
| 6,397,981 B1 | * | 6/2002 | Tamasho et al. ........... 188/71.9 |

FOREIGN PATENT DOCUMENTS

| | | |
|---|---|---|
| DE | 197 54 454 A1 | 6/1998 |
| EP | 0 137 162 A1 | 4/1985 |
| JP | A 61-149697 | 7/1986 |
| JP | A 6-201015 | 7/1994 |

* cited by examiner

*Primary Examiner*—Matthew C. Graham
(74) *Attorney, Agent, or Firm*—Oliff & Berridge, PLC

(57) ABSTRACT

A screw actuator comprises a nut and a screw each comprising helical grooves, said nut and screw engaging each other by rollers or balls which are in contact with said grooves, a lubricant being provided for the grooves and rollers or balls. Integrated in the actuator is a module, which is connected to at least the helical grooves of the nut and/or screw for replenishing the lubricant for the grooves and rollers or balls of the actuator.

33 Claims, 6 Drawing Sheets

SCREW ACTUATOR WITH LUBRICANT DOSING, AND BRAKE CALLIPER

The invention is related to a screw actuator, comprising a nut and a screw each comprising helical grooves, said nut and screw engaging each other by means of rollers or balls which are in contact with said grooves, a lubricant being provided for the grooves and rollers or balls, and means which are integrated in the actuator for replenishing the lubricant for the grooves and rollers or balls of the actuator.

Such screw actuator is disclosed in U.S. Pat. No. 5,809, 838. Said actuator comprises an oil reservoir in the gap between the races of the actuator support bearing.

The object of the invention is to provide an actuator in which the means for replenishing the lubricant can be applied in an easier and more versatile way. This object is achieved in that the means for replenishing the lubricant comprise a separate module or modular reservoir for containing an amount of lubricant, said module being held within a bore in the screw and being provided with means for feeding the lubricant to at least the helical grooves of the nut and/or screw.

Such separate, self-contained module is easy to install in an appropriately prepared actuator. Also, replacement of the module can be achieved in a simple way.

The screw and/or nut may comprise a pump means for expelling an amount of lubricant from the reservoir onto the grooves and rollers or balls.

The pump means may be driven in various ways. For instance, the pump means may be drivable by means of a relative displacement between the screw and the nut.

Alternatively, the pump means may be drivable by means of a gas pressure. Also, the pump means may be electrically drivable, control means being provided for controlling said electrically drivable pump means, e.g. a piezo-electric drive means.

Such piezo-electric drive means engages or comprises a piston, said piston being accommodated in the module.

According to a relatively simple embodiment, one of the nut and screw comprises an abutment, and the other comprises a pump means which is drivable by engagement with said abutment. Said abutment and the pump means engage each other upon approachment of the fully retracted position of the screw with respect to the nut.

In this embodiment, the grooves receive a fresh amount of lubricant upon replacement of the brake pads, after they have been worn out. Upon fitting the new, unworn brake pads, the screw actuator is pushed back to its original start position, thus bringing the pump means in engagement with the abutment. As a result, an amount of lubricant is driven from the reservoir towards the grooves.

Other ways of lubricating the grooves are possible as well. For instance, the grease reservoir may contain a screw pump and at least one grease outlet, said screw pump being arranged for displacing the grease through said outlet under the influence of a drive means actuatable through the relative displacement of nut and screw.

The screw actuator may comprise a sensor which detects a condition indicative for replenishment of lubricant. The sensor may be integrated in the bearing, or may be separately incorporated in the actuator. Said sensor emits a signal to a control unit, which in turn may actuate the pump means.

The invention is furthermore related to a brake calliper for a disc brake comprising a housing which carries two opposite brake pads enclosing a gap for accommodating a brake disc, said brake pads being displaceable towards and from each other by means of a screw actuator as described before, said screw actuator comprising a nut and a screw one of which is rotatably supported with respect to the housing by means of a rolling element bearing, said nut and screw comprising helical grooves and engaging each other by means of rollers or balls which are in contact with said grooves, a lubricant being provided for the grooves and rollers or balls.

According to the invention, means are provided which are integrated in the actuator for replenishing the lubricant for the grooves and rollers or balls of the actuator. Said means for replenishing the lubricant comprises a module which is connected to at least the screw threaded grooves of the nut or screw.

The grease may be fed towards the grooves by means of bleeding, or pumping. The pumping action may take place in a mechanical way, e.g. by means of a screw pump, or by a hybrid pump such as a piezo-electric pump. Also, the pump may be controlled on the basis of a detection signal from a sensor, indicating the need for regreasing the grooves.

The actuator may comprise either a ball screw or a roller screw.

Moreover, either the screw or the nut may be rotating.

The invention will now be described further with reference to the embodiments shown in the figures.

Figure 1:
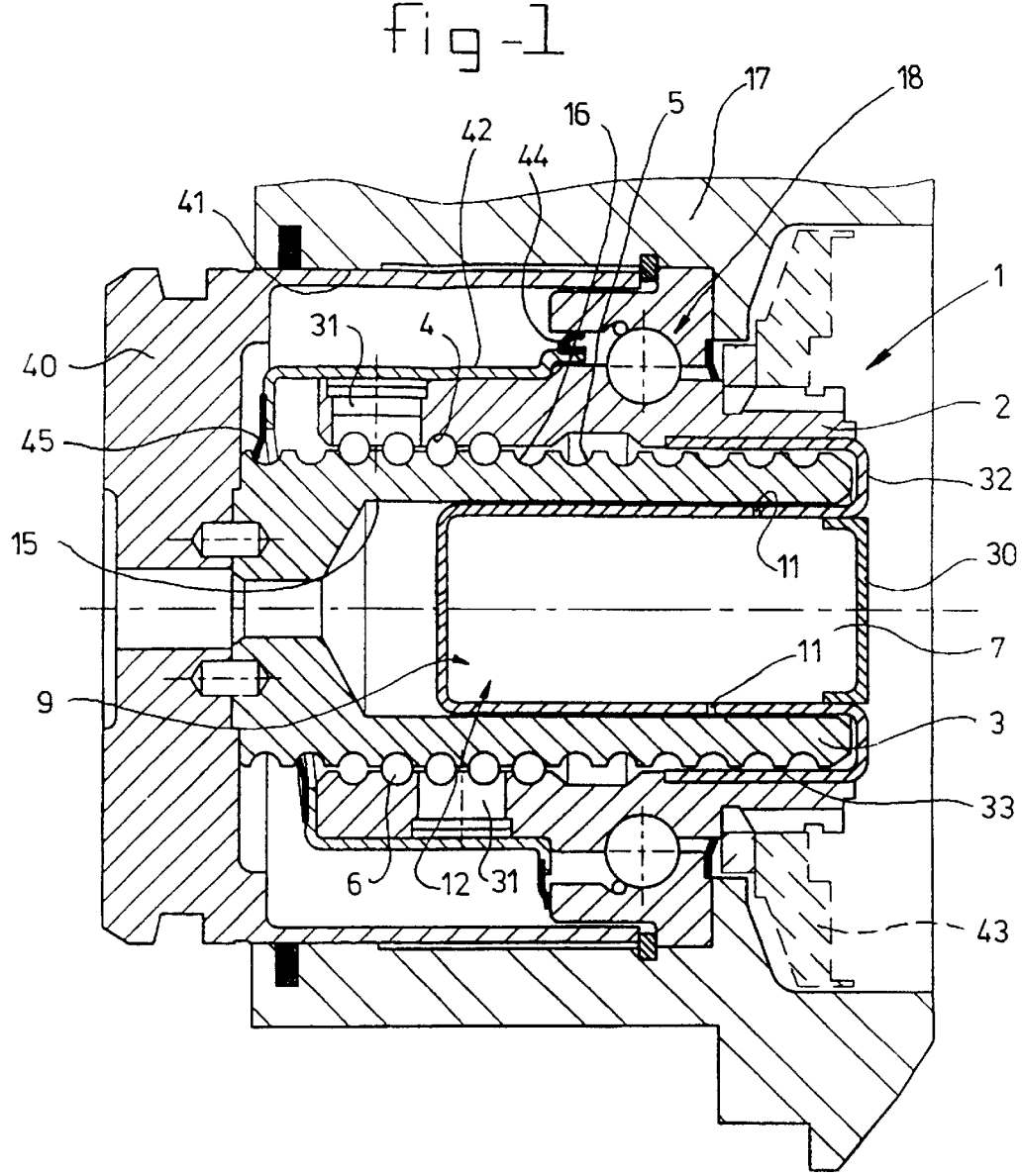
FIG. 1 shows a first embodiment of an actuator according to the invention.

The screw actuator 1 shown in FIG. 1 comprises a nut 2 and a screw 3 which each contain helical grooves 4, 5. These grooves engage each other by means of balls 6, which by means of suitably shaped inserts 31, are switched between neighbouring windings of said grooves 4, 5 upon relative rotation of nut 2 and screw 3.

The screw 3 is connected to a piston 40, which is slidably accommodated in a cylindrical bore 41 in the housing 42.

The nut 2 is drivable by a drive means 43, which may be connected to a motor (not shown) accommodated in the housing 17 as well.

By means of an angular contact ball bearing 18, the nut 2 is rotatably supported with respect to the housing 17. The inner ring of the bearing 18 is integrated in the nut 1. Upon rotating the nut 2 by means of drive means 43, the screw 3 is moved in axial direction, together with piston 40.

A sleeve 42 surrounds the nut 2. This sleeve 42 contains several functions. It carries the seals 44 and 45 for sealing the internal space of the screw actuator and the bearing space of the bearing 18. Moreover, it secures the inserts 31 in their proper position.

According to the invention, a module or modular reservoir 9 is connected to the nut 2. This reservoir protrudes in the bore 15 of the screw 3. It comprises a cup 12 which is closed off by means of end cap 30. Said cap 30 carries a flange 32, which in turn carries a circumferential sleeve 33 which is connected to the inside of the nut 2.

The wall of the cap 12 has apertures 11, via which oil contained in a grease lubricant may bleed under the influence of centrifugal forces and increased temperatures towards the raceways 4, 5 and balls 6 through the annulus defined between the bore 15 and the cap 12.

Figure 2:
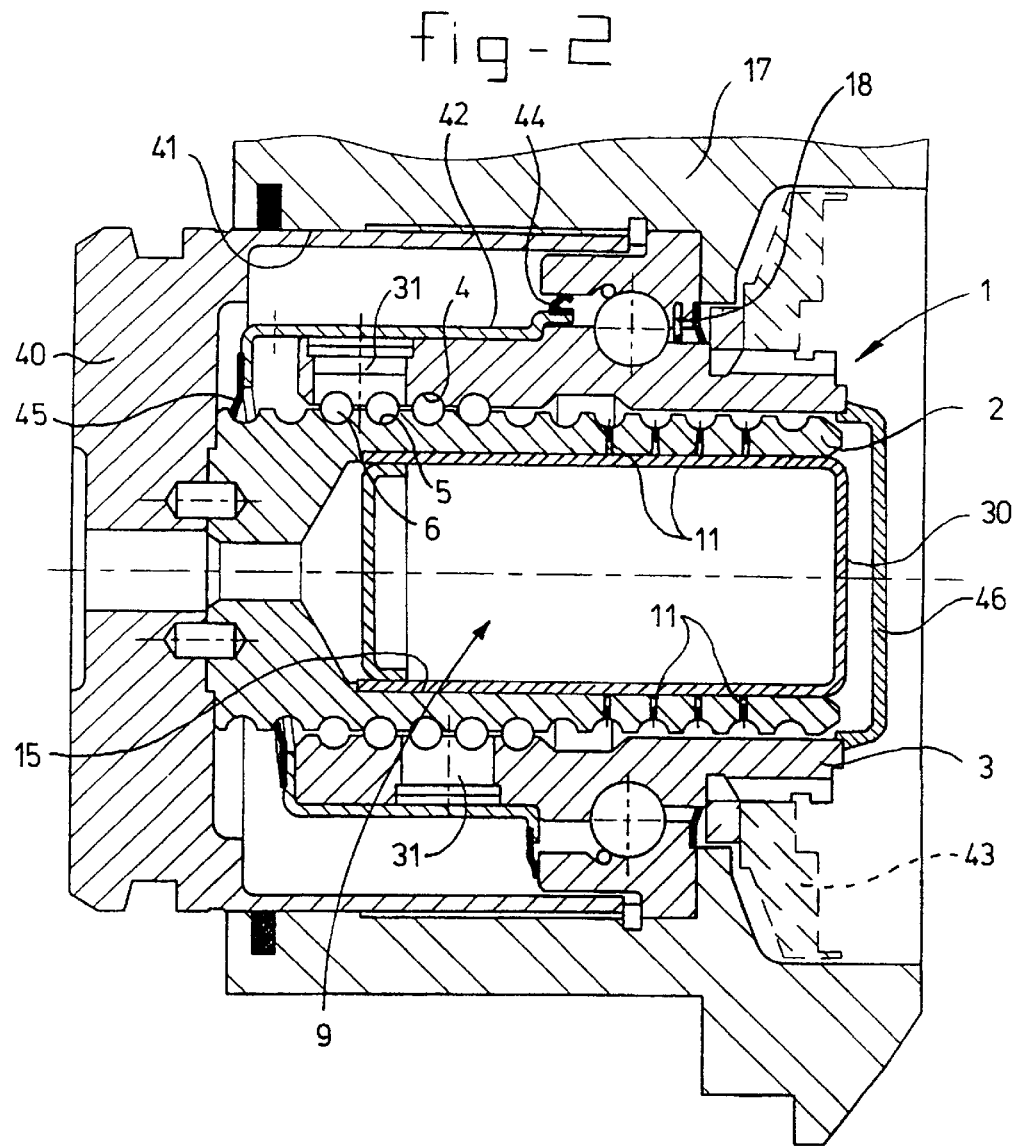
FIG. 2 shows a second embodiment.

The embodiment according to FIG. 2 comprises an actuator 1 which to a large extend is identical to the actuator 1 according to FIG. 1.

In this embodiment however, the modular grease reservoir 9 is accommodated in the bore 15 of the screw 2 itself, and closed off by means of end cap 30. Also, the nut 3 is closed off by means of an end cap 46.

Between the bore 15 and the helical groove 5 of the screw 2, apertures 11 extend. Through these apertures, oil contained in a grease lubricant may bleed under the influence of centrifugal forces and increased temperatures.

Figure 3:
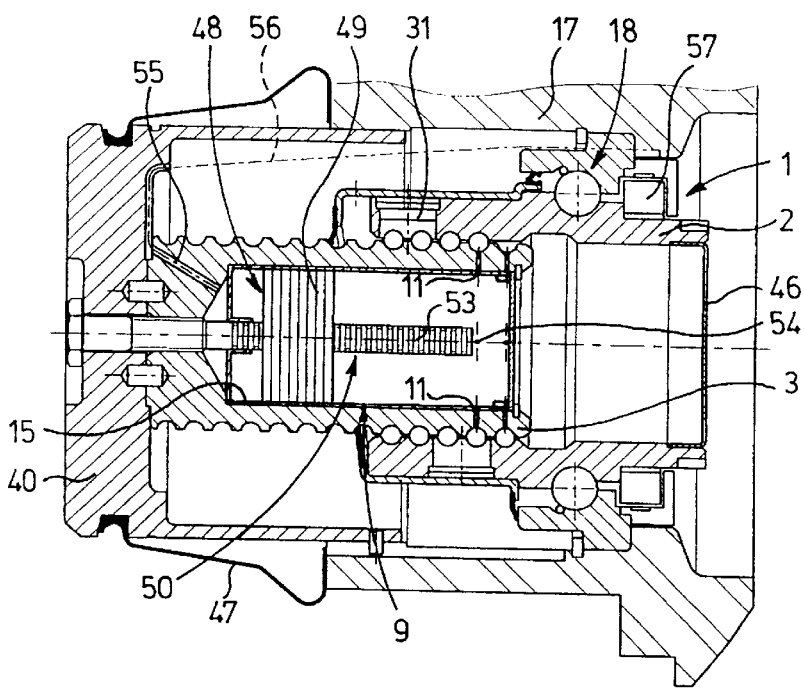
FIGS. 3 and 4 show a third embodiment.
Figure 4:
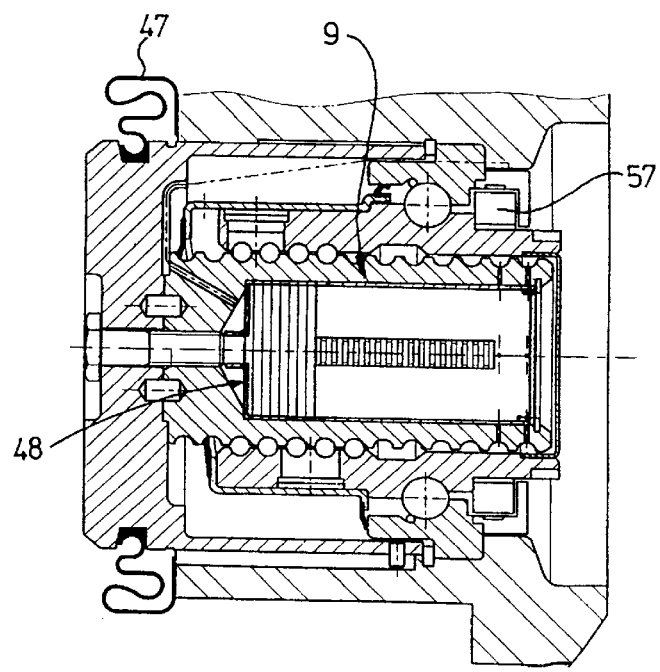

The embodiment of FIGS. 3 and 4 show an actuator, the bore 15 of which accommodates a modular reservoir 9 which contains a piezo-electric pump 48. FIG. 3 shows the screw 3 with the piston 49 of the pump 48 in fully extended position, FIG. 4 shows the actuator with screw 3 and the piston 49 in fully retracted position. A rubber bellows 47 closing and sealing the space between housing 17 and piston 40 is shown as well.

The piezo-electric pump 48 comprises a piston 49 consisting of a number of consecutive piezo-electric elements. These piezo-electric elements 49 are supported on a support shaft 50, which has a ratchet surface 53. Said support shaft 50 protrudes through a bore in the consecutive piezo-electric elements 49, which bore contains a pawl mechanism. The ratchet 53 and pawl in the bore of the piezo-electric elements 49 form a one-way-drive, such that upon consecutive actuation of the piezo-electric elements the pump 48 formed by these elements 49 gradually shifts to the free end 54 of the support shaft 50.

In the situation shown in FIG. 4 the piston 48 is at its start position, whereas in the situation shown in FIG. 3 the piston 48 has been shifted already somewhat to said free end 54 of the support shaft 50. Thereby, an amount of oil or grease has been expelled via the apertures 11 in the screw 3 towards the grooves 4, 5.

Via a small bore 55 in the piston, an electrical lead 56 for actuating the piezo-electric elements 49 has been guided.

In order to control the piezo-electric pump 48 in the proper way, a control unit as been provided (not shown), which receives signals from the sensor 57 which detects the relative rotations between the inner and outer ring of the bearing 18. On the basis of this information, the pump 48 may be. e.g. periodically, actuated for supplying grease or oil to the grooves 4, 5 and balls 6.

Figure 5:
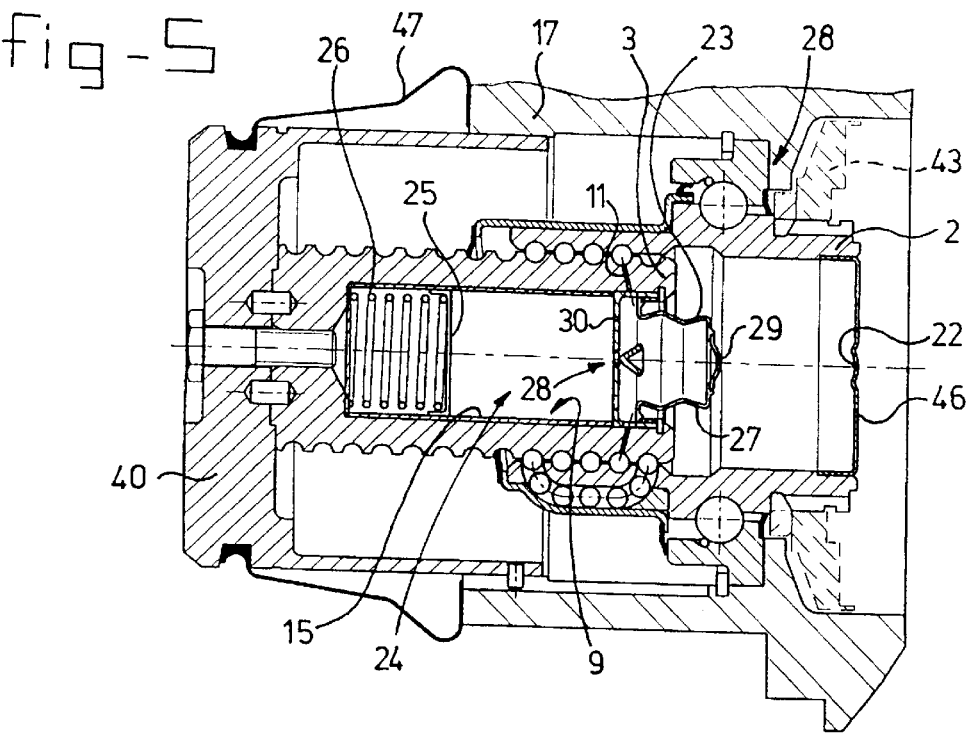
FIGS. 5 and 6 show a fourth embodiment.
Figure 6:
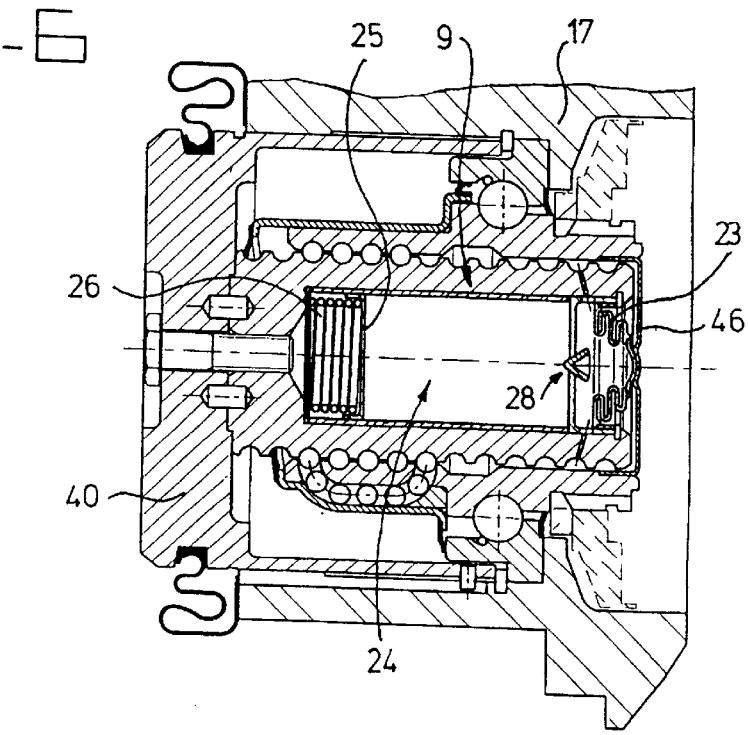

The embodiment of FIGS. 5, and 6 (FIG. 5 extended position, FIG. 6 retracted position of screw 3 and nut 40), show a screw actuator for a brake calliper of a disc brake. The screw 3 carries a modular reservoir and a modular mechanical pump means 23. This modular mechanical pump means 23 comprises a bellows 27, and a one way valve 28 contained in a wall 30. The one way valve 28 opens out in the bore 15.

This bore 15 furthermore contains a piston 25, which by means of spring 26 is constantly urged towards the pump means 23. Furthermore, the bore 15 comprises an amount of grease or oil.

During service of the actuator in question, the brake pad connected to piston 40, and the opposite brake pad as well move gradually wear down due to frictional engagement with an associated brake disc. As a result, the screw 3 together with piston 40 gradually move to a more extended position.

The pump means 23 carries an end 29, which initially rests against abutment 22 of end cap 3 connected to the nut 2: see FIG. 6. The engagement of end 29 and abutment 22 is a pivot engagement, which allows mutual rotations resulting from the relative rotating movements of screw 3 and nut 2.

During the gradual movement to the extended position of screw 3 and piston 40 as addressed before, the bellows 27, via one way valve 28, is gradually filled with grease under the influence of the preload exerted by the spring 26 and piston 25 on the grease or oil contained in the bore 15. The bellows 27 extends, as the one way valve 28 is easily opened by the overpressure.

Once the brake pads 17 wear down so much, that they should be replaced, the pistons 40 together with screw 3 is pushed back to the initial position as shown in FIG. 6. As a result, the end 29 of bellows 27 engages abutment 22 of end cap 46. A pressure built up in the bellows 27 then occurs, causing the one way valve 28 to close. Subsequently, the grease or oil contained in the pump means 23 is driven via apertures 11 towards the grooves 4, 5 and the balls 6.

Figure 7:
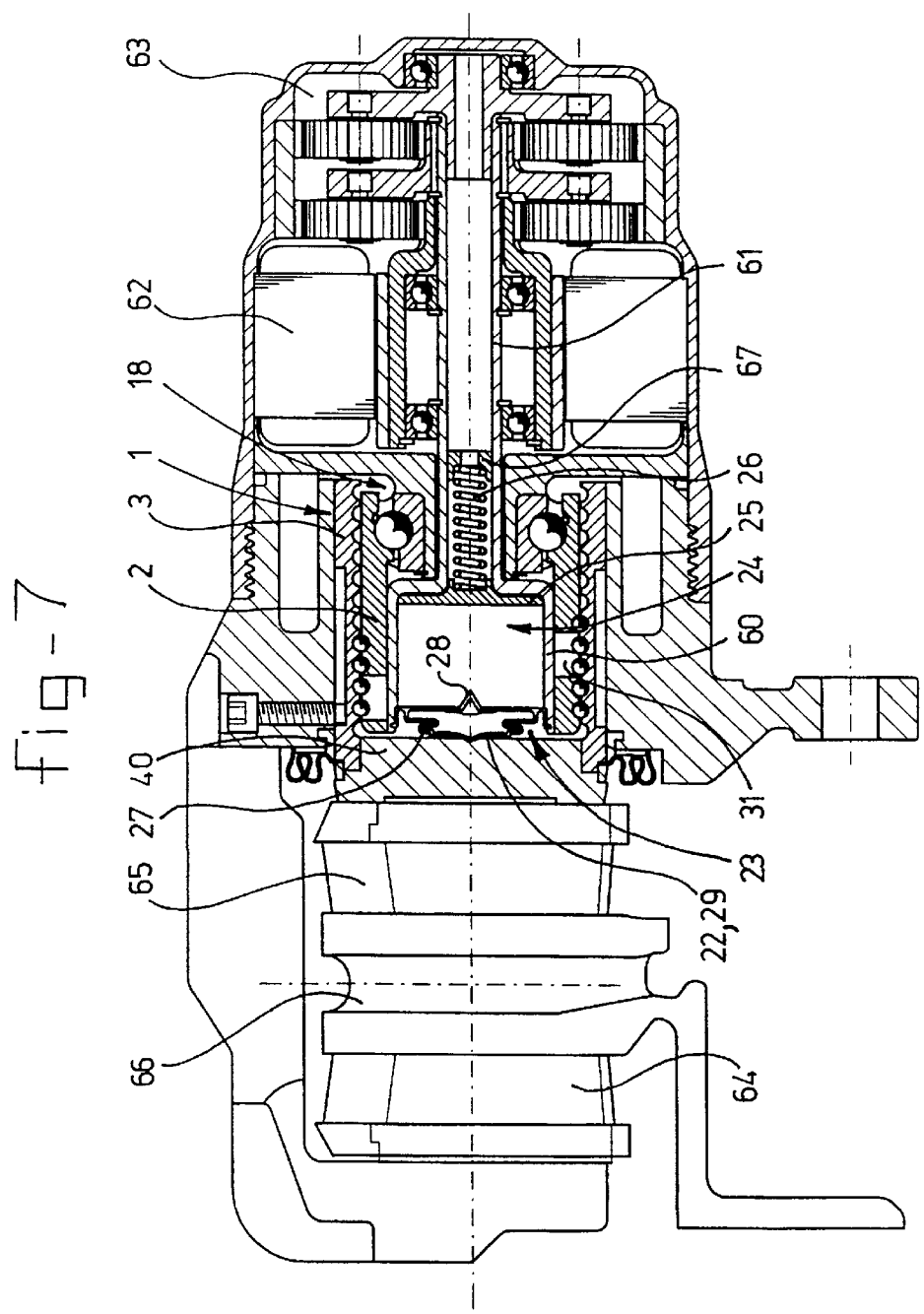
FIG. 7 shows a brake calliper comprising an actuator according to the invention.

The brake calliper according to FIG. 7 comprises an actuator having a modular mechanical pump means 23 similar to the one in the embodiment of FIGS. 5 and 6. The modular mechanical pump means 23 however is now contained in a separate sleeve 60, containing an amount of grease or oil 24. This sleeve 60 forms a unity with a central tube 61 which extends through the support bearing 18, the drive motor 62 and the reduction gear mechanism 63.

Said motor 62 via said reduction gear mechanism 63 drives the tube 61. Having regard to the fact that the sleeve 60 is fixedly connected to the screw 2 of the actuator 1, the nut 3 is axially but non-rotatably displaced so as to actuate the brake pads 64, 65 for engagement with the brake disc 66.

The spring 26 extends through the tube 61 and is supported against an internal fixed wall 67. Via piston 25, spring 26 exerts a pressure onto the amount of grease 24 contained in the sleeve 60.

As is the case in the embodiments of FIGS. 3 and 4, the pump means 23 is gradually filled with grease or oil via one way valve 28 upon the displacement of the piston 40 with screw 3 to the extended position.

In a similar way as in the embodiments of FIGS. 5 and 6. an amount of oil or grease is pumped by means of pump means 23 towards the grooves 4, 5 and balls 6 as soon as the piston 40 together with screw 3 are pushed back to the fully retracted position.

The sleeve 60 additionally acts to keep the inserts 31, now contained in the screw 3, in their proper position.

Figure 8:
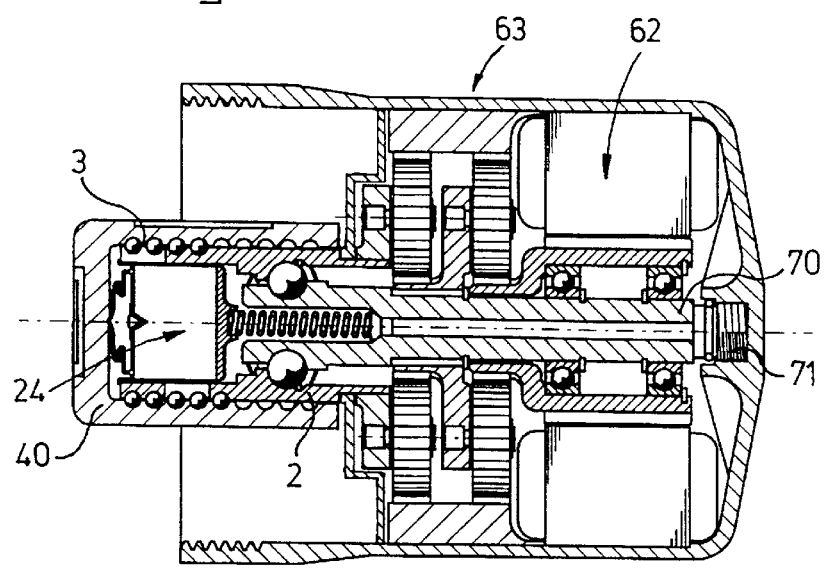
FIGS. 8 and 9 show a further actuator for a brake calliper.
Figure 9:
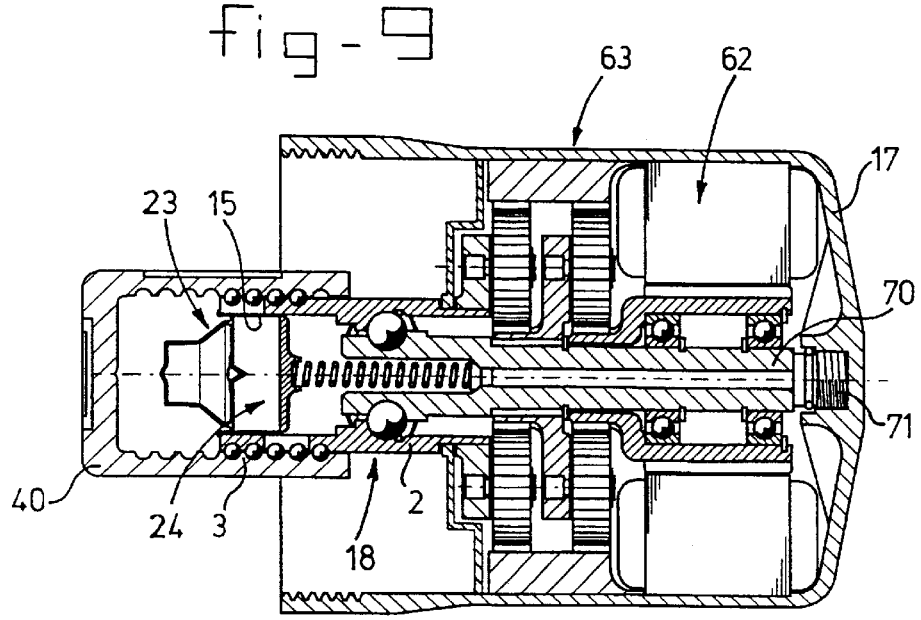

The somewhat different embodiment of the screw actuator of FIGS. 8 and 9, now with reversed positions of motor 62 and reduction gear mechanism 63, can also be applied in the brake calliper according to FIG. 7. FIG. 8 shows the fully retracted position of the piston 40 which is now fully integrated with nut 3, FIG. 9 shows the fully extended position.

The screw 2 by means of integrated angular contact ball bearing 18 is supported by means of a central support shaft, connected fixedly to housing 17. A load cell 71 is available between the central support shaft 70 and the housing 17, for measuring axial loads.

The asymmetric angular contact ball bearing 18 is now integrated with both the screw 2 and the central support shaft 70.

Furthermore, the screw contains an internal bore 15 and the modular pump means 23 which are similar to the modular pump means 23 of embodiments of FIGS. 5–7.

The function of the modular pump means 23 according to FIGS. 8 and 9 are similar, and will therefore not be further addressed in detail.

What is claimed is:

1. A screw actuator, comprising:
   a nut and a screw each including helical grooves, said nut and screw engaging each other by means of rollers or balls which are in contact with said grooves; and a lubricant being provided for the grooves and rollers or balls, and means which are integrated in the actuator for replenishing the lubricant for the grooves and rollers or balls of the actuator, characterized in that the means for replenishing the lubricant include a modular reservoir for containing an amount of lubricant, said modular reservoir being held within a bore in the screw and being provided with means for feeding the lubricant to at least one of the helical grooves of the nut and screw.

2. Screw actuator according to claim 1, wherein at least one of the screw and nut comprises a pump means for expelling an amount of lubricant from the module onto the grooves and rollers or balls.

3. Screw actuator according to claim 2, wherein the module and the pump means are accommodated in a bore in the screw.

4. Screw actuator according to claim 2, wherein the pump means are drivable by means of a relative displacement between screw and nut.

5. Screw actuator according to claim 4, wherein one of the nut and screw comprises an abutment, and the other comprises a pump means which is drivable by engagement with said abutment.

6. Screw actuator according to claim 5, wherein the abutment and the pump means engage each other upon approachment of the fully retracted position of the screw with respect to the nut.

7. Screw actuator according to claim 6, wherein the pump means are fed with lubricant from a source which is at an overpressure.

8. Screw actuator according to claim 7, wherein the pump means and the grease reservoir are accommodated within a bore in the screw, and the abutment is connected to the nut.

9. Screw actuator according to claim 8, wherein the bore near one end contains a piston which is preloaded, into the direction of the pump means which are situated at the other end of the bore.

10. Screw actuator according to claim 9, wherein the pump means comprises a bellow which has a one-way valve system at the side of the piston, the opposite end of the bellows being fit for engagement with the abutment.

11. Screw actuator according to claim 2, wherein the pump means are drivable by means of a gas pressure.

12. Screw actuator according to claim 2, wherein the pump means are electrically drivable, control means being provided for controlling said electrically drivable pump means.

13. Screw actuator according to claim 12, wherein the pump means are drivable by a piezo-electric drive means.

14. Screw actuator according to claim 13, wherein the piezo-electric drive means engages or comprises a piston, said piston being accommodated in a cylindrical bore in the screw.

15. Screw actuator according to claim 13, wherein the piezo-electric drive means engages a support providing a one-way drive, such that upon consecutive drive actions of the piezo-electric drive means, said drive means gradually move along the support into the direction as defined by said one-way drive.

16. Screw actuator according to claim 2, wherein the module contains a screw pump and at least one grease outlet, said screw pump being arranged for displacing the grease through said outlet under the influence of a drive means actuatable through the relative displacement of nut and screw.

17. Screw actuator according to claim 16, wherein the screw pump comprises a coarse-bladed pump screw (Archimedes-screw), said pump screw being drivable by a drive shaft which engages the pump screw by means of a one-way drive mechanism, such that upon longitudinal displacement of the drive shaft in one direction, the pump screw is driven in rotation, and that upon displacement of the drive shaft in the opposite direction no drive action is exerted on the pump screw.

18. Screw actuator according to claim 16, wherein the module is carried by the nut, the screw being connected to the drive means.

19. Screw actuator according to claim 18, wherein the screw contains a bore accommodating the module, the outlet of said module being connected to the space containing the rollers or balls.

20. Screw actuator according to claim 19, wherein the bore contains the drive shaft which extends into the module for driving the screw pump.

21. Screw actuator according to claim 1, wherein a sensor, is provided which detects a condition indicative for replenishment of lubricant.

22. Screw actuator according to claim 2, wherein mechanical or electric control means are provided for controlling the pump means.

23. Screw actuator according to claim 22, wherein the control means, sensor and pump means are arranged in a closed-loop configuration.

24. A brake calliper for a disc brake, comprising:

a housing which carries two opposite brake pads enclosing a gap for accommodating a brake disc, said brake pads being displaceable towards and from each other by means of one or more screw actuators, each screw actuator including a nut and a screw, at least one of which is rotatably supported with respect to the housing by means of a rolling element bearing, said nut and screw comprising helical grooves and engaging each other by means of rollers or balls which are in contact with said grooves;

a lubricant being provided for the grooves and rollers or balls, means for replenishing the lubricant including a modular reservoir for containing an amount of lubricant, said modular reservoir being held within a bore in the screw and being provided with means for feeding the lubricant to at least one of the helical grooves of the nut and screw.

25. Brake calliper according to claim 24, wherein the screw comprises a bore which is closed off by means of an end cap.

26. Brake calliper according to claim 24, wherein at least one of the screw and nut comprises a pump means for expelling an amount of lubricant from the module onto the grooves and rollers or balls.

27. Brake calliper according to claim 26, wherein the module is integrated into at least one of the screw, nut, around the nut and in the calliper.

28. Brake calliper according to claim 26, wherein the module is situated around the nut.

29. Brake calliper according to claim 26, wherein the module is situated in a bore of the screw.

30. Brake calliper according to claim 26, wherein control means are provided for controlling the pump means.

31. Brake calliper according to claim 30, wherein the control means, sensor, pump means and control unit are arranged in a closed-loop configuration.

32. Brake calliper according to claim 24, wherein said means for replenishing the lubricant comprises supply means for supplying the lubricant to the grooves.

33. Brake calliper according to claim 24, wherein the module is connected to the helical groove of the nut or screw by means of at least one bore provided in said nut or screw and opening out in said groove.

* * * * *